United States Patent [19]

Glaeser

[11] 4,214,913

[45] Jul. 29, 1980

[54] PROCESS FOR PRODUCING RUTILE $TiO_2$

[75] Inventor: Hans H. Glaeser, Wilmington, Del.

[73] Assignee: E. I. Du Pont de Nemours and Company, Wilmington, Del.

[21] Appl. No.: 17,342

[22] Filed: Mar. 5, 1979

[51] Int. Cl.² ............................................. C01G 23/04
[52] U.S. Cl. ...................... 106/300; 423/265; 423/613
[58] Field of Search ............. 106/300; 423/265, 610, 423/613, 614

[56] References Cited

U.S. PATENT DOCUMENTS

| | | | |
|---|---|---|---|
| 2,760,938 | 8/1956 | Dempster et al. ................... | 106/300 |
| 3,169,074 | 2/1965 | Holbein ................................ | 106/300 |
| 3,329,483 | 7/1967 | Evans et al. ......................... | 106/300 |
| 3,443,897 | 5/1969 | Wilson et al. ....................... | 106/300 |
| 3,486,913 | 12/1969 | Zirngibl et al. ..................... | 423/613 |
| 3,547,671 | 12/1970 | Hitemann et al. .................. | 106/300 |
| 3,642,442 | 2/1972 | Hoekji et al. . | |
| 3,767,455 | 10/1973 | Claridge et al. . | |
| 3,856,929 | 12/1974 | Angerman et al. ................ | 423/610 |
| 4,097,301 | 6/1978 | Wildt .................................... | 423/613 |

*Primary Examiner*—Herbert T. Carter

[57] ABSTRACT

A process for preparing rutile $TiO_2$ by a process comprising oxidizing with oxygen or an oxygen containing gas, a mixture $TiCl_4$ and $AlCl_3$ and after at least 80% of the $TiCl_4$ has been converted to $TiO_2$ adding sufficient $PCl_3$ to form from 0.1–0.5% $P_2O_5$ in the $TiO_2$, the amount of $AlCl_3$ being sufficient to form 0.1–1.5% $Al_2O_3$ in the $TiO_2$.

11 Claims, No Drawings

PROCESS FOR PRODUCING RUTILE TiO$_2$

DESCRIPTION

TECHNICAL FIELD

The present invention relates to a process for preparing titanium dioxide from titanium tetrachloride, aluminum trichloride and phosphorous trichloride by oxidation. More specifically, the process of the present invention relates to preparing titanium dioxide by oxidation of titanium tetrachloride in the presence of aluminum chloride followed by the addition of phosphorous trichloride when the conversion to titanium dioxide is at least 80%.

BACKGROUND ART

It is disclosed in U.S. Pat. No. 3,547,671 that titanium tetrachloride can be oxidized in the presence of aluminum trichloride and phosphorous trichloride to give rutile titanium dioxide. The amount of AlCl$_3$ was sufficient to form 2–4% Al$_2$O$_3$ and the amount of PCl$_3$ was sufficient to form from 0.5–3% P$_2$O$_5$ based on the weight of TiO$_2$ pigment formed. It is also disclosed that rutilization is impeded by PCl$_3$ but that the effect of PCl$_3$ may be compensated for by increasing the AlCl$_3$.

DISCLOSURE OF THE INVENTION

Now a process has been found for preparing titanium dioxide substantially in the rutile form. The present invention provides for obtaining a higher rutile TiO$_2$ at any given level of AlCl$_3$ within the scope of the invention as compared to simultaneous addition of AlCl$_3$ and PCl$_3$ at one point in the reaction. The process of this invention comprises the oxidation of TiCl$_4$, in the presence of AlCl$_3$, with the later introduction into the oxidation of PCl$_3$, when at least 80% of the TiCl$_4$ is converted to TiO$_2$.

Accordingly, in a process for manufacturing rutile titanium dioxide by reacting TiCl$_4$ and oxygen or a gas containing oxygen in a reaction chamber in the presence of AlCl$_3$ and PCl$_3$ wherein the AlCl$_3$ and PCl$_3$ are added together and the amount of AlCl$_3$ is sufficient to form 2–4% Al$_2$O$_3$ in the TiO$_2$ and the amount of PCl$_3$ is sufficient to form 0.5–3% P$_2$O$_5$ in the TiO$_2$, the improvement has been found, wherein rutile titanium dioxide is prepared, comprising adding sufficient PCl$_3$ to form 0.1–0.5% P$_2$O$_5$ in the TiO$_2$ separately at a later point in the reaction than when AlCl$_3$ is added where the TiCl$_4$ is at least 80% converted to TiO$_2$, said AlCl$_3$ being present in an amount sufficient to form 0.1–1.5% Al$_2$O$_3$ in the TiO$_2$.

The oxidation is conducted in the presence of oxygen or a gas containing oxygen. The oxygen or gas containing oxygen is preheated to a temperature of 800°–1600° C. and then introduced into a reaction chamber of a metal pipeline-type reactor. The temperature in the reactor of the combined oxidizing gas stream and TiCl$_4$/AlCl$_3$ can range rather widely. Generally, the temperature ranges from 1000°–1500° C.

Aluminum trichloride is added with the titanium tetrachloride in such a manner that the aluminum trichloride and titanium tetrachloride are uniformly distributed into the reactor space so that more efficient contact with preheated oxygen occurs. The aluminum trichloride and titanium tetrachloride are mixed and then sprayed concentrically in the vapor state into the reactor. Rapid, efficient mixing of the TiCl$_4$/AlCl$_3$ can be accomplished by the use of an annular ring with outlets and side tee mixing as taught in U.S. Pat. No. 2,791,490.

The amount of aluminum trichloride that can be added is sufficient to form 0.1–1.5% Al$_2$O$_3$ based on the TiO$_2$ pigment. Amounts of AlCl$_3$ that will form less than 0.1% will give optical values for the product TiO$_2$ that are lower to the point of making a less efficient pigment. Amounts of AlCl$_3$ that will form more than 1.5 Al$_2$O$_3$ offer no advantage. Minimization of the AlCl$_3$ reduces corrosion of the metallic reactor. However, AlCl$_3$ is essential in the formation of rutile TiO$_2$. Corrosion of the metallic reactor that results with oxidation in the presence of AlCl$_3$, PCl$_3$, TiCl$_4$ is greatly reduced by the present invention.

Phosphorous trichloride is added to the reactor at a point in the oxidation reaction where at least 80%, preferably 88–98%, most preferably 90–94%, of the TiCl$_4$ introduced into the reactor has been converted to TiO$_2$. In a pipeline-type reactor the addition point of PCl$_3$ will vary depending on the size of the reactor and the particular target conversion level. It was determined that in a 10-inch inside diameter tubular reactor with oxygen at 980° C. and operating at a rate of 7830 kg of oxygen per hour with sufficient Al$_2$O$_3$ to provide 1% Al$_2$O$_3$ in the TiO$_2$ that at a point 5 feet from the entrance of the TiCl$_4$ a conversion of 92% of the TiCl$_4$ to TiO$_2$ had occurred.

The reaction initiated is an exothermic type. Therefore, the temperature in the reactor is at least 800° C. and ranges from 800°–1500° C. and preferably 1100°–1500° C. The addition of the PCl$_3$ after the achievement of at least 80% conversion to TiO$_2$ results in the need for less AlCl$_3$ to achieve the levels of rutilization achieved by this invention. Thus, the present invention offers better control of rutilization. The percent rutile in the product TiO$_2$ achieved by this invention is from 85–100%, preferably 92–100% and most preferably 98–100%. The present process produces more rutile at a given level of AlCl$_3$ than does the process where the addition of AlCl$_3$ and PCl$_3$ at the same point in the reaction. Percent rutile is determined by X-ray diffraction as is well known in the art.

Thus, the present invention results in better control of rutilization and reduced corrosion of the metallic reactor through reduced levels of AlCl$_3$ with the capability of achieving essentially complete rutilization. What is meant by essentially complete rutilization is 98–100%.

The amount of PCl$_3$ that is added in the process of this invention is sufficient to form 0.1–0.5% P$_2$O$_5$, preferably 0.1–0.3% P$_2$O$_5$ in the TiO$_2$. Amounts of PCl$_3$ that will form less than 0.1% P$_2$O$_5$ result in lower optical values for the TiO$_2$. Amounts of PCl$_3$ that will form more than 0.5% P$_2$O$_5$ give no advantage. When PCl$_2$ is added with AlCl$_3$ and TiCl$_4$, the rutilization, among other things, is effected. More AlCl$_3$ is therefore required. However, when PCl$_3$ is added after the TiCl$_4$/AlCl$_3$ addition and after at least 80% of the TiCl$_4$ is converted to TiO$_2$, the PCl$_3$ does not substantially affect the rutilization and therefore less AlCl$_3$ is required to achieve a given rutilization.

The process of this invention also results in a reduction in the viscosity of a slurry of the TiO$_2$ in the processing of the TiO$_2$ product. The TiO$_2$ resulting from the oxidation reaction of this invention is in a semi-finished state. In order to prepare the TiO$_2$ for use in paper and board applications, a slurry is prepared as is illustrated in Example 3 below. In paint and plastics use the $TiO_2$ is wet treated, washed and milled to a dry powder.

EXAMPLES

In the examples that follow all percentages and parts are by weight unless otherwise indicated.

EXAMPLE 1—(BEST MODE)

A stream of oxygen preheated to a temperature of 980° C. was introduced into one end of a 10-inch inside diameter tubular, chlorine purged reactor operated at 1.76 kg/cm² gauge at a rate of 7730 kg per hour.

A titanium tetrachloride stream containing sufficient aluminum trichloride to provide one percent $Al_2O_3$ in the titanium dioxide based on the titanium dioxide was preheated to 480° C. and introduced into the reactor in vapor form through an annular ring and mixing tee to insure complete and uniform mixing with the preheated oxygen.

The temperature of the reaction gas stream was 1300°–1450° C. after the addition of the titanium tetrachloride and aluminum trichloride is complete. $PCl_3$ is then added at a point where 92% of the $TiCl_4$ was converted to $TiO_2$ through a similar annular ring in sufficient quantity to provide 0.25% $P_2O_5$ on the titanium dioxide. The $PCl_3$ addition was followed by scrub solids before the reaction stream exited the reactor into cooling ducts. The reaction stream with the scrub solids was cooled. The reaction produced pigmentary size 100% rutile $TiO_2$.

Scrub solids are rutile $TiO_2$ of granular 20–40 mesh size that has been calcined and was used to clean the walls of the reactor.

COMPARATIVE EXAMPLE A

Rutile $TiO_2$ was prepared by the process of Example 1 except that sufficient $AlCl_3$ was added to form 1% $Al_2O_3$ in the $TiO_2$ and no $PCl_3$ was added.

COMPARATIVE EXAMPLE B

Rutile $TiO_2$ was prepared by the process of Example 1 except that $PCl_3$ was added with the $TiCl_4$ and $AlCl_3$ and the amount of $AlCl_3$ and $PCl_3$ was sufficient to form 1% $Al_2O_3$ and 0.25% $P_2O_5$ respectively in the $TiO_2$.

COMPARATIVE EXAMPLE C

Rutile $TiO_2$ was prepared by the process of Example 1 except that sufficient $AlCl_3$ was added to form 1.5% $Al_2O_3$ and sufficient $PCl_3$ was added with the $AlCl_3$ to form 0.25% $P_2O_5$.

EXAMPLE 2

Rutile $TiO_2$ was prepared by the process of Example 1 except that sufficient $AlCl_3$ and $PCl_3$ was added to form 1% $Al_2O_3$ and 0.57% $P_2O_5$ respectively.

EXAMPLE 3

The $TiO_2$ prepared by Examples 1 and 2 and Comparative Examples A, B and C was made into a rutile pigment slurry by the process described below and the data obtained is shown in the table that follows:

682 kg of $H_2O$ were added to a grind tank. Add 10.9 kg of powdered tetrapotassium pyrophosphate and 16.4 kg of liquid 2-amino-2-methyl-1-propanol (AMP) were added to the $H_2O$ and stirred until dissolved. 2730 kg of $TiO_2$ prepared as described above were added over a period of 20 minutes to form a slurry. The slurry (80% solids) was ground for 30 minutes. The slurry contents were diluted to ~72% by adding 409 kg of $H_2O$. The slurry was screened to remove grit. Samples were evaluated for optical value (blue green brightness) in a typical board coating formula.

BOARD COATING EVALUATION

| Example No. | % Solids | Rutile | Viscosity | Optical Value Blue | Green |
|---|---|---|---|---|---|
| Comparative Example A | 72.5 | 99 | 1200 | 85 | 85 |
| Comparative Example B | 72.4 | 95 | 600 | 102 | 102 |
| Comparative Example C | 72.5 | 98–99 | 600 | 103 | 101 |
| 1 | 71.9 | 99 | 630 | 102 | 101 |
| 2 | 72.2 | 99 | 460 | 99 | 97 |

EXAMPLE 4

(Evaluation in Enamel Grade Pigment)

The process described in Example 1 was followed except that sufficient $PCl_3$ and $AlCl_3$ was added to form the percent $P_2O_5$ and percent $Al_2O_3$ shown below to prepare $TiO_2$. For this process, 4000 grams of $TiO_2$ was placed in 10 liters of water and the slurry that resulted was heated to 60° C. Fifty percent NaOH was added to bring the pH to 9.0. Three hundred twenty cc of a sodium aluminate solution (375 g $Al_2O_3$/liter) and enough 20% HCl solution to maintain the pH at 9.0 was added. The pH was adjusted to 8.2 with 20% HCl. The slurry was digested for 30 minutes at 60° C., filtered, washed to 7000 ohms and dried at 140° C. for 48 hours. The dry powder was divided into four equal parts and ground in a fluid energy mill at rates of 350 g/min, 650 g/min, 1100 g/min and 2200 g/min. The pigment samples are evaluated in a high gloss alkyd enamel.

ALKYD ENAMEL EVALUATION

| Sample | Rate | Gloss |
|---|---|---|
| Enamel grade | 650 g/min | 79 |
| 0.25% $P_2O_5$ | 1100 g/min | 79 |
| 1.0% $Al_2O_3$ | 2200 g/min | 75 |
| Enamel grade | 650 g/min | 79 |
| 0.46% $P_2O_5$ | 1100 g/min | 78 |
| 1.0% $Al_2O_3$ | 2200 g/min | 77 |

EXAMPLE 5

(Evaluation in Plastic Grade)

The process of Example 1 was followed except that sufficient $PCl_3$ and $AlCl_3$ was added to form the $P_2O_5$ and $Al_2O_3$ shown below to prepare $TiO_2$. Four thousand grams of this $TiO_2$ were dispersed in 2000 ml of $H_2O$ and diluted to 10,000 ml of solution by adding $H_2O$. The contents were stirred and heated to 60° C. Thirty-eight ml of a sodium aluminate solution were added. (341 g $Al_2O_3$/liter.) The pH was adjusted to 8.0 with hydrochloric acid. The mixture was cured at 60° C. for ½ hour, filtered, washed to 7000 ohms and dried about 48 hours at 140° C. It was then screened through a 10 mesh screen and treated with a grinding aid and ground in a fluid energy mill.

Samples were also prepared by scaling the laboratory procedure that follows up to 50 tons. Samples were evaluated in polyethylene dispersed in the conventional manner.

| POLYETHYLENE EVALUATION | | |
|---|---|---|
| | Brightness | Yellow Index |
| Lab sample 0.25% P$_2$O$_5$, 1% Al$_2$O$_3$ | 93.8 | 3.3 |
| Plant sample 0.25% P$_2$O$_5$, 1% Al$_2$O$_3$ | 94.6 | 3.0 |
| Plant sample 0.25% P$_2$O$_5$, 1% Al$_2$O$_3$ | 94.7 | 2.7 |

EXAMPLE 6

(Evaluation in Emulsion Flat Grades)

The procedure of Example 1 was followed except that sufficient PCl$_3$ and AlCl$_3$ was added to form the percent P$_2$O$_5$ and percent Al$_2$O$_3$ show below to prepare TiO$_2$.

Three thousand grams of this TiO$_2$ was placed in 10 liters of water and the slurry that resulted was heated to 70° C. and 30 ml of a 20% hydrochloric acid added. Five hundred thirty-eight ml of a sodium silicate solution (390 g SiO$_2$/liter) were added while maintaining the pH below 7.0 with 20% hydrochloric acid. The pH was adjusted to 7.5-8.0 with 50% NaOH solution. The slurry was digested at 70° C. for ½ hour. Five hundred cc of a sodium aluminate solution (360 g Al$_2$O$_3$/liter) were added while holding the pH between 7.5 and 8.0 with 20% hydrochloric acid. The slurry was digested at 70° C. for ½ hour, filtered, washed to 7000 ohms and dried at 140° C. for 48 hours. It was then ground in a fluid energy mill. The samples were evaluated in interior emulsion flat paints.

| | EVALUATION Emulsion Flat Hiding | | | | | |
|---|---|---|---|---|---|---|
| | Interior Emulsion Test Formula 0.3 kg TiO$_2$/kg 48 PVC | | | Interior Emulsion Test Formula 0.2 kg TiO$_2$/kg 55 PVC | | |
| Sample | HP | HPo | Stain | HP | HPo | Stain |
| Flat emulsion grade lab produced 0.25% P$_2$O$_5$ 1.00% Al$_2$O$_3$ | 120 | 63.0 | cons$^-$ | 112 | 65 | vvsl$^-$ |

INDUSTRIAL APPLICABILITY

The process of this invention produces an essentially 100% rutile TiO$_2$ with less metallic corrosion in the oxidation reactor than when PCl$_3$ is added with TiCl$_4$ and AlCl$_3$. The 100% rutile TiO$_2$ made into a slurry for paper or board application displays superior optical values and lower slurry viscosities. The 100% rutile TiO$_2$ from oxidation is wet treated, filtered, washed, dried and fluid energy milled to form a dry TiO$_2$ for plastics pigmentation and for paints.

I claim:

1. In a process for manufacturing rutile titanium dioxide by reacting TiCl$_4$ and oxygen or a gas containing oxygen in a reaction chamber in the presence of AlCl$_3$ and PCl$_3$ wherein the AlCl$_3$ and PCl$_3$ are added to the reactor together, the amount of AlCl$_3$ is sufficient to form 2-4% Al$_2$O$_3$ in the TiO$_2$ and the amount of PCl$_3$ is sufficient to form 0.5-3% P$_2$O$_5$ in the TiO$_2$, the improvement wherein rutile TiO$_2$ is produced comprising adding sufficient PCl$_3$ to form 0.1-0.5% P$_2$O$_5$ in the TiO$_2$ separately at a later point in the reactor than where AlCl$_3$ is added where the TiCl$_4$ is at least 80% converted to TiO$_2$, said AlCl$_3$ being present in an amount sufficient to form 0.1-1.5% Al$_2$O$_3$ in the TiO$_2$.

2. The improvement of claim 1 wherein the amount of PCl$_3$ is sufficient to form 0.1-0.3% P$_2$O$_5$.

3. The improvement of claim 1 wherein the TiCl$_4$ is 88-98% converted to TiO$_2$.

4. The improvement of claim 3 wherein the rutile titanium dioxide amounts to from 92-100% as measured by X-ray diffraction.

5. The improvement of claim 3 wherein the amount of PCl$_3$ is sufficient to form 0.1-0.3% P$_2$O$_5$.

6. The improvement of claim 1 wherein the TiCl$_4$ is 90-94% converted to TiO$_2$.

7. The improvement of claim 6 wherein the rutile titanium dioxide amounts to from 92-100% as measured by X-ray diffraction.

8. The improvement of claim 6 wherein the amount of PCl$_3$ is sufficient to form 0.1-0.3% P$_2$O$_5$.

9. The improvement of claim 1 wherein the rutile titanium dioxide amounts to from 92-100% as measured by X-ray diffraction.

10. The improvement of claim 9 wherein the amount of PCl$_3$ is sufficient to form 0.1-0.3% P$_2$O$_5$.

11. The improvement of claim 1 wherein the rutile titanium dioxide amounts to from 98-100% as measured by X-ray diffraction.

* * * * *